US012644974B2

(12) United States Patent
Knutson et al.

(10) Patent No.: US 12,644,974 B2
(45) Date of Patent: Jun. 2, 2026

(54) SYSTEM AND METHOD OF CORRECTING ORIENTATION ERRORS

(71) Applicant: Aptiv Technologies AG, Schaffhausen (CH)

(72) Inventors: Eric P. Knutson, Kokomo, IN (US); Jeff N. Tran, Kokomo, IN (US)

(73) Assignee: Aptiv Technologies AG, Schaffhausen (CH)

( * ) Notice: Subject to any disclaimer, the term of this patent is extended or adjusted under 35 U.S.C. 154(b) by 934 days.

(21) Appl. No.: 16/788,928

(22) Filed: Feb. 12, 2020

(65) Prior Publication Data

US 2021/0247506 A1 Aug. 12, 2021

(51) Int. Cl.
| | |
|---|---|
| *G01S 7/497* | (2006.01) |
| *B60W 50/00* | (2006.01) |
| *G01S 7/40* | (2006.01) |
| *G01S 7/481* | (2006.01) |
| *G01S 17/86* | (2020.01) |
| *G01S 17/931* | (2020.01) |

(52) U.S. Cl.
CPC ........... *G01S 7/4972* (2013.01); *B60W 50/00* (2013.01); *G01S 7/4026* (2013.01); *G01S 7/481* (2013.01); *G01S 17/86* (2020.01); *G01S 17/931* (2020.01); *B60W 2050/0008* (2013.01)

(58) Field of Classification Search
CPC ...... G01S 7/4972; G01S 17/86; G01S 17/931; G01S 7/4026; G01S 7/481; B60W 50/00; B60W 2050/0008
See application file for complete search history.

(56) References Cited

U.S. PATENT DOCUMENTS

| | | | |
|---|---|---|---|
| 5,807,284 A | 9/1998 | Foxlin | |
| 6,162,191 A | 12/2000 | Foxlin | |
| 10,401,484 B2 | 9/2019 | Lee et al. | |
| 11,187,793 B1 * | 11/2021 | Liu ...................... G05D 1/0088 | |
| 2013/0154870 A1 | 6/2013 | Mills et al. | |
| 2013/0185018 A1 | 7/2013 | Sheng | |
| 2014/0098229 A1 * | 4/2014 | Lu .......................... H04N 7/181 | |
| | | | 348/148 |

(Continued)

FOREIGN PATENT DOCUMENTS

| | | |
|---|---|---|
| CN | 106289275 A | 1/2017 |
| CN | 109690354 A | 4/2019 |

(Continued)

OTHER PUBLICATIONS

Extended European Search Report for EP Application No. 21153727.9, dated Jul. 14, 2021, 8 pages.

(Continued)

*Primary Examiner* — Toya Pettiegrew
(74) *Attorney, Agent, or Firm* — Billion & Armitage

(57) ABSTRACT

An orientation system comprises an orientation sensor, a distance sensor, and vehicle processing unit. The orientation sensor is configured to generate orientation data. The distance sensor is configured to generate relative distance data measuring relative distances to objects external to the vehicle. The vehicle processing unit is configured to receive the orientation data from the orientation sensor and the relative distance data from the distance sensor, wherein the vehicle processing unit detects orientation errors based on the relative distance data.

18 Claims, 5 Drawing Sheets

(56) References Cited

U.S. PATENT DOCUMENTS

| | | | |
|---|---|---|---|
| 2017/0206674 A1 | 7/2017 | Westerhoff et al. | |
| 2018/0113204 A1* | 4/2018 | Chon | G01C 25/005 |
| 2018/0172455 A1* | 6/2018 | Yamaguchi | G01C 21/005 |
| 2019/0035107 A1 | 1/2019 | Neisius | |
| 2020/0041623 A1* | 2/2020 | Keyetieu | G01S 17/89 |
| 2020/0132822 A1* | 4/2020 | Pimentel | G01S 17/86 |
| 2020/0271689 A1* | 8/2020 | Nichols | G01S 7/497 |

FOREIGN PATENT DOCUMENTS

| | | | |
|---|---|---|---|
| CN | 110388917 A | 10/2019 | |
| EP | 2187170 A2 | 5/2010 | |
| EP | 2187170 B1 | 7/2015 | |
| EP | 3236210 A1 | 10/2017 | |
| WO | 2017/042576 A1 | 3/2017 | |

OTHER PUBLICATIONS

Office Action for Chinese Application No. 2025042101611380; mailed on Apr. 21, 2025, 19 Pages.
"Notice of Decision to Grant mailed on Feb. 9, 2026", 6 Pages.

\* cited by examiner

SYSTEM AND METHOD OF CORRECTING ORIENTATION ERRORS

FIELD

This disclosure is generally directed to correcting orientation errors accumulated in orientation instruments and more specifically to utilizing object detection feedback to correct the orientation errors.

BACKGROUND

Vehicles and in particular autonomous or self-driving vehicles utilize orientation sensors (sometimes referred to as inertial measurement units or IMUs) to determine the orientation (i.e., roll, pitch, yaw) of the vehicle. For example, in an orientation sensor may include one or more of an accelerometer, gyroscope and magnetometer to determine and maintain the orientation of the vehicle. Orientation of the vehicle may be utilized by a number of vehicle systems, including vehicle locating systems and object detection systems. For example, in some embodiments orientation information is utilized to provide dead-reckoning estimates of vehicle location in the event satellite-based locating systems are unavailable. In addition, the orientation of the vehicle may be utilized in combination with one or more object sensors (e.g., radar-based sensors, LiDAR-based sensors, laser-sensors, etc.) to determine the location of objects relative to the vehicle.

Over time, orientation sensors may accumulate errors. As the magnitude of these errors increases, it may have a detrimental effect on the systems utilizing the orientation information. In some embodiments, orientation errors (at least with respect to the vertical axis) may be corrected based on input provided by a secondary sensor, such as an inclinometer. However, the addition of another sensor increases the cost and decreases the reliability associated with the vehicle. It would be beneficial to develop a system and method of correcting orientation errors without requiring additional dedicated sensors.

SUMMARY

According to one aspect, an orientation system is described that includes an orientation sensor, a distance sensor, and a vehicle processing unit. The distance sensor is configured to measure relative distances to objects external to the vehicle. The vehicle processing unit is configured to receive the orientation data from the orientation sensor and the relative distance data from the distance sensor, wherein the vehicle processing unit detects orientation errors based on the relative distance data.

According to another aspect, a method of correcting orientation errors accumulated in an orientation sensor includes receiving orientation data defining an orientation of a vehicle along one or more orientation axes. The method further includes receiving relative distance data from a distance sensor, wherein the relative distance data is comprised of relative distances measured to external objects. Planar surfaces are detected in the received relative distance data and one or more surface axes associated with the detected planar surfaces and a variance is calculated between the orientation axes and the planar axes. One or more of the orientation axes is corrected in response to the calculated variance being less than a threshold value.

DETAILED DESCRIPTION

Orientation sensors are employed on vehicles to provide on-board systems with information regarding the orientation of the vehicle. Over time these systems may accumulate errors, which degrades the overall performance of the vehicle. According to some aspects of the present disclosure, relative distance data received from one or more distance sensors are utilized to correct errors accumulated in the orientation sensors. More particularly, the relative distance data is analyzed to detect planar surfaces (e.g., sides of building, signposts, etc.). For those planar surfaces aligned approximately with an orientation axis of the vehicle, an assumption is made that these surfaces are aligned with a vehicle axis. For example, a building located adjacent the vehicle is likely to have a planar surface approximately vertical relative to the ground. A vertical axis defined by the side of the building is likely to be aligned with a vertical axis of the vehicle adjacent the building. Differences between the vertical axis (or horizontal axis) defined by the planar surface and the orientation axis provided by the orientation sensor are determined to represent an error in the orientation data. In response to the detected variance or difference between the respective axes, an adjustment or correction is provided to modify the orientation of the orientation sensor to correct the error. Although the assumption that the axis defined by the planar surface is correctly aligned with a vehicle axis is clearly incorrect on a case-by-case basis (e.g., side of building, signpost, etc. is offset from vertical slightly), the error or variance in the axis defined by the planar surface relative to the vehicle is gaussian. That is, it is just as likely that the building or signpost is offset from vertical in one direction as it is to be in an opposite direction. As a result, accumulating corrections over time and a plurality of planar surfaces will cause the orientation to be corrected toward an approximately correct value. In this way, distance sensors commonly employed on vehicle systems may be employed to prevent the accumulation of orientation errors in the corresponding orientation sensors.

Figure 1:
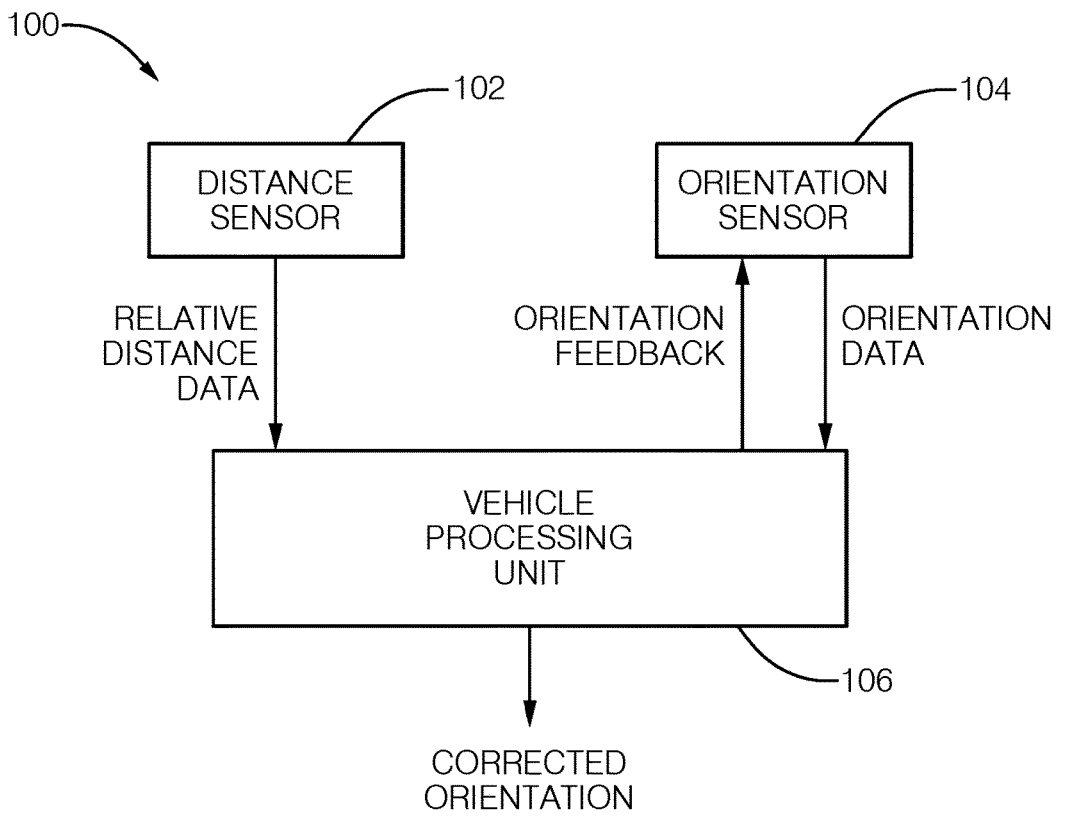
FIG. 1 is a block diagram of components utilized to correct orientation errors based on relative distances measured by a distance sensor according to some embodiments.

FIG. 1 is a block diagram of the various sensors— including distance sensors 102 and orientation sensors 104—configured to communicate with a vehicle processing unit 106. Orientation sensor 104 includes one or more of an accelerometer, gyroscope, magnetometer, and/or other sensors utilized to measure and determine the orientation of the vehicle. Vehicle processing unit 106 utilizes orientation data in a number of applications, such as determining a heading of the vehicle, interpreting objects detected by the one or more distance sensors 102, and/or determining a position of the vehicle. As discussed above, orientation sensor 104 may accumulate errors over time that if left unchecked may result in erroneous orientation estimates provided to the vehicle processing unit 106.

The one or more distance sensors 102 are utilized to measure the relative distances to objects located external to the vehicle. The one or more distance sensors 102 may include one or more of laser distance and ranging (LiDAR) sensors, cameras or visions-based sensors, proximity sensors, laser sensors, radar sensors, acoustic sensors, and others. In some embodiments, each of the distance sensors 102 collects a plurality of points—sometimes referred to as a point cloud—wherein each point in the point cloud described the distance of the point from the sensor. Subsequent analysis of the point cloud by a vehicle processing unit 106 (or by the sensor itself) allows the points to be clustered into surfaces representing objects located adjacent to the vehicle 100. According to some embodiments, assumptions about the surfaces detected by the distance sensors 102 are utilized to correct errors in the orientation sensor 104. In the embodiment shown in FIG. 1, vehicle processing unit 106 detects the errors and provides orientation feedback to orientation sensor 104 to correct the detected errors. In other embodiments, no feedback is required, but vehicle processing unit 106 modifies orientation data provided by the orientation sensor 104 to correct the detected errors.

Figure 2A:
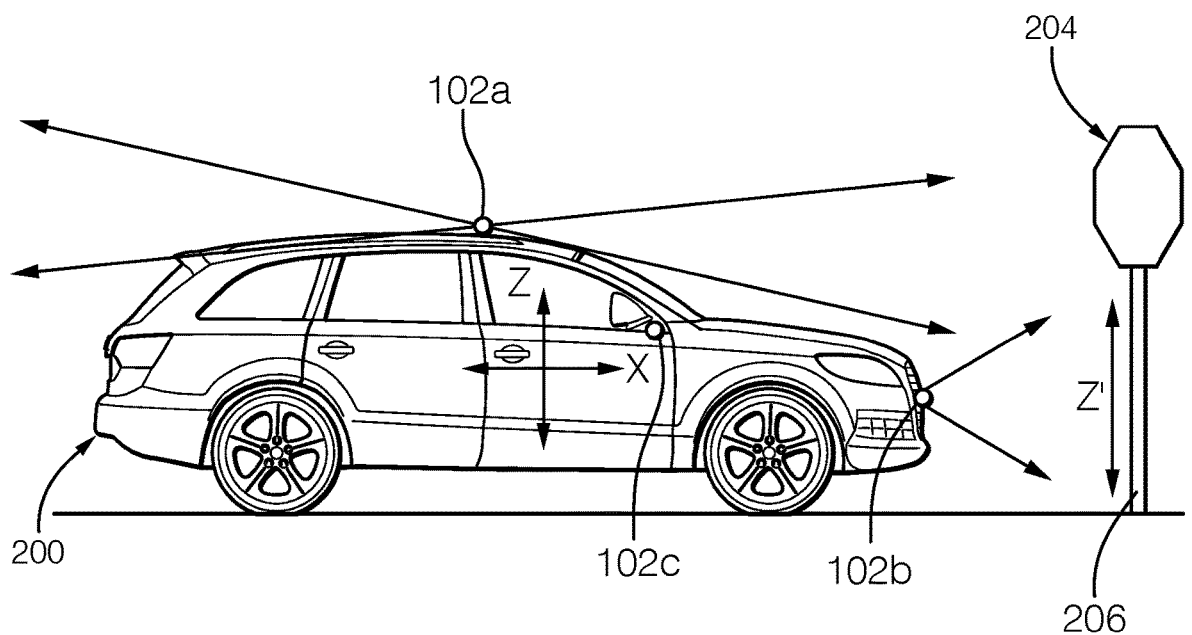
FIGS. 2a and 2b are top and side views of a vehicle that includes a plurality of position sensors utilized to correct orientation errors according to some embodiments.
Figure 2B:
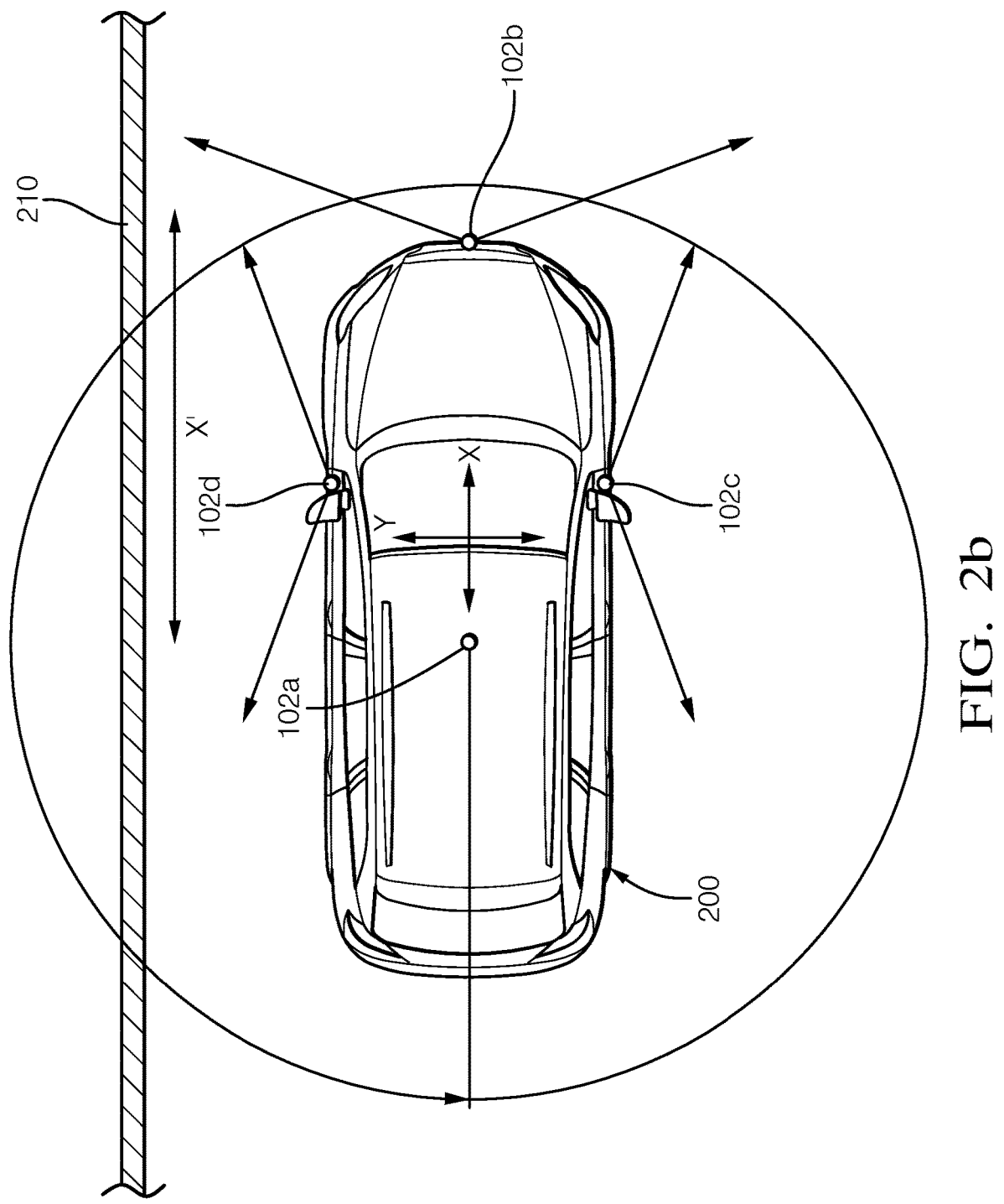

With respect to FIGS. 2a and 2b, a top view and side view of a vehicle 200 is illustrated that includes a plurality of distance sensors 102a-102d. FIG. 2a illustrates assumptions relied on to correct the vertical axis of the orientation sensor and FIG. 2b illustrates assumptions relied upon to correct a horizontal axis of the orientation sensor. The orientation of the vehicle is represented by rotation about three principal axes labeled here x, y, and z (referred to as the vehicle orientation). For the purposes of discussion, the z-axis is oriented vertically, the x-axis is oriented longitudinally along a length of the vehicle 200, and the y-axis is oriented laterally along a width of the vehicle 200. The orientation sensor 104 (shown in FIG. 1) is configured to measure the orientation of the vehicle 200, and to provide orientation data to the vehicle processing unit 106 (also shown in FIG. 1). The one or more distance sensors 102a-102d are located at various locations around the vehicle and configured to detect objects located adjacent or external to the vehicle 200.

FIG. 2a is a side view of the vehicle 200 that illustrates detection of a vertically aligned object by the distance sensor 102b. In particular, the sensor 102b measures relative distances between the sensor 102b and objects located within the field of view of the sensor 102b. The collection of relative distances are analyzed to detect surfaces, such as the surfaces associated with stop sign 204 and signpost 206. In some embodiments, planar surfaces detected by the distance sensors 102 are utilized for detecting orientation errors. For example, in the embodiments shown in FIG. 2a, signpost 206 provides a planar surface that may be selected as useful for detecting orientation errors. With respect to planar surfaces oriented vertically, an assumption is made that the vertical axis is oriented approximately straight up and down (i.e., perpendicular to the horizon), and therefore is aligned with the vertical axis of the vehicle. Variances or errors detected by comparing the vertical axis z' associated with the planar surface with the vertical axis defined by the orientation sensor 106 is attributed to an error in the orientation sensor 106. In response to the detected variance, an adjustment or corrective value may be generated to correct the orientation indicated by the orientation sensor 106. Although this assumption may be invalid in a particular instance, it is further assumed that errors in the axes defined by the planar surfaces (such as axes z') relative to the vehicle axes are gaussian in nature and will cancel out as the number of planar surfaces analyzed increases. That is, a first signpost 106 mis-aligned slightly from vertical (and therefore mis-aligned slightly with the vertical axis z of the vehicle 200) in a first direction will be offset by a second or subsequent signpost mis-aligned in the opposite direction. In addition to signposts used as an example in FIG. 2a, most structures having a planar surface rising in a vertical direction are approximately perpendicular with the horizon—and therefore represent a vertical axis z' that should be aligned with the vertical axis z of the vehicle. For example, the planar surface associated with most buildings is approximately vertical in nature. While this may not be true for all buildings, for the most part buildings are oriented approximately vertically, with an error from a true vertical orientation that is gaussian in nature. Furthermore, as discussed in more detail below, if the planar surface defines an axis that is much different than the orientation axis of the vehicle (e.g., a signpost partially knocked down, extending at an angle of 45 degrees relative to the horizonal), steps may be taken to discard the planar surface from analysis.

The example illustrated in FIG. 2a is provided with respect to the vertical axis, but in other embodiments similar analysis may be provided with horizontal axes (e.g., x, y) as well. For example, in the embodiment shown in FIG. 2b, distance sensor 102d detects a side of a building 210. The building 210 is relatively planar and defines an axis x'. An assumption is made that the horizontal axis x' is aligned approximately with the longitudinal axis x of the vehicle 200. Differences or variances between the horizontal axis x' defined by the planar surface 210 and the longitudinal orientation provided by the orientation sensor are attributable to errors in the orientation sensor 104. The assumption provided with respect to horizontal axes is that most roads are aligned (either parallel or perpendicular) with adjacent buildings. As a result, the horizontal axes x', y' defined by planar surfaces adjacent to the vehicle 200 are likely aligned with an orientation axis x, y of the vehicle 200. In some embodiments, an additional assumption may be relied upon that if a building is not aligned with the road, it is aligned with a cardinal direction (i.e., North, South, East, West) and may be utilized to detect errors in the orientation sensor.

Figure 3:
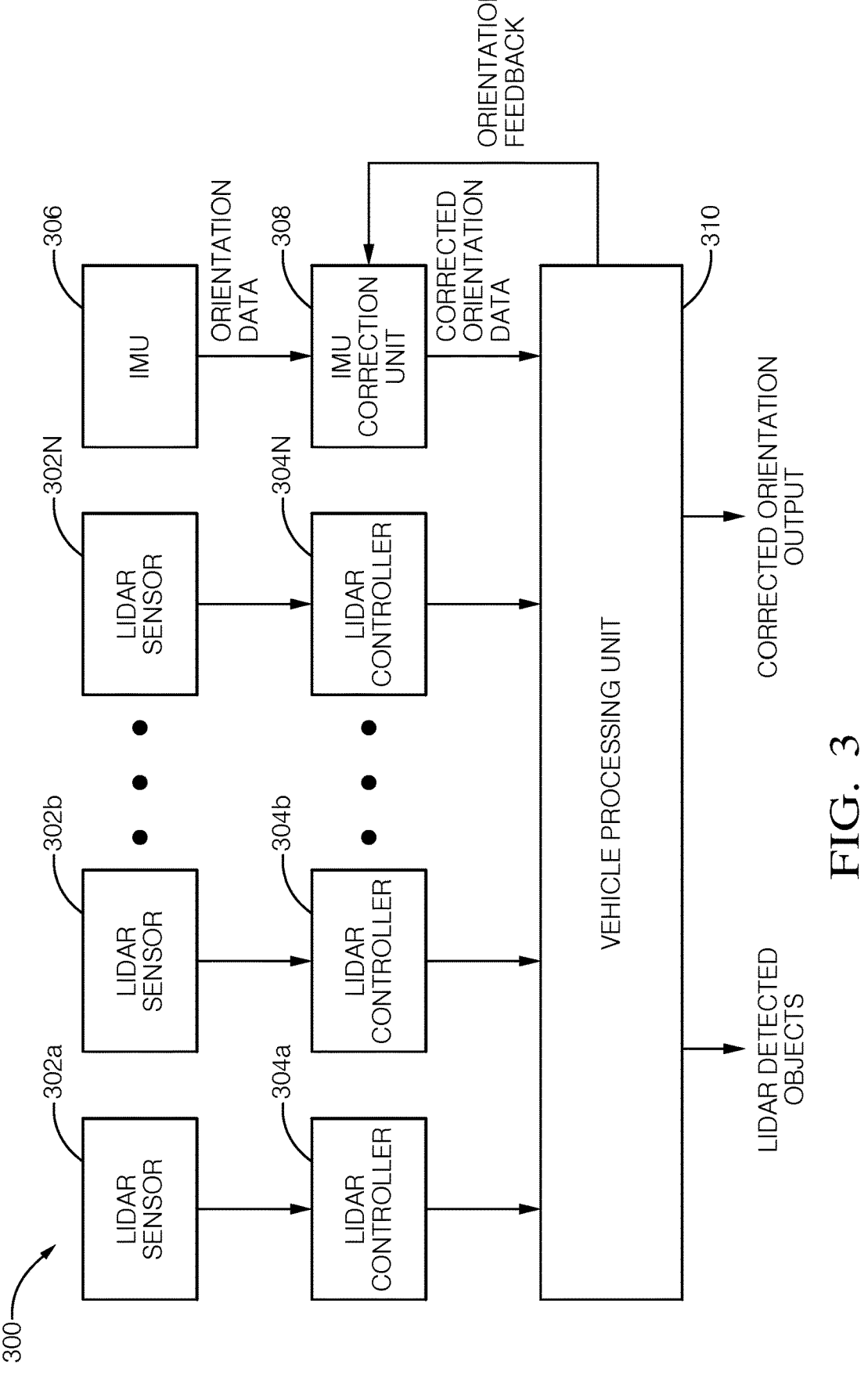
FIG. 3 is a block diagram of a plurality of LiDAR sensors utilized to correct orientation errors accumulated in an IMU according to some embodiments.

Referring now to FIG. 3, a block diagram of components included in an orientation system 300 is shown according to some embodiments. In the embodiment shown in FIG. 3, orientation system 300 includes a plurality of LiDAR sensors 302, 302b, . . . , 302N, a plurality of LiDAR controllers 304a, 304b, . . . , 304N, an IMU 306, an IMU correction unit 308, and a vehicle processing unit 310. The plurality of LiDAR sensors 302a, 302b, . . . , 302N are utilized to collect relative distance data, which is provided to the plurality of LiDAR controllers 304a, 304b, . . . , 304N, respectively. In this embodiment, the LiDAR controllers (generically referred to as LiDAR controllers 304) process the point clouds collected by the plurality of LiDAR sensors 302. In some embodiments, LiDAR controllers 304 cluster points and detects surfaces. The vehicle processing unit 310 receives detected surfaces from the LiDAR controllers 304 and utilizes the surfaces to detect and identify objects (provided as an output labeled "LiDAR Detected Objects"). In addition, vehicle processing unit 310 may use the surfaces detected by the LiDAR controllers 304 to detect errors in orientation data provided by IMU 306.

Figure 5:
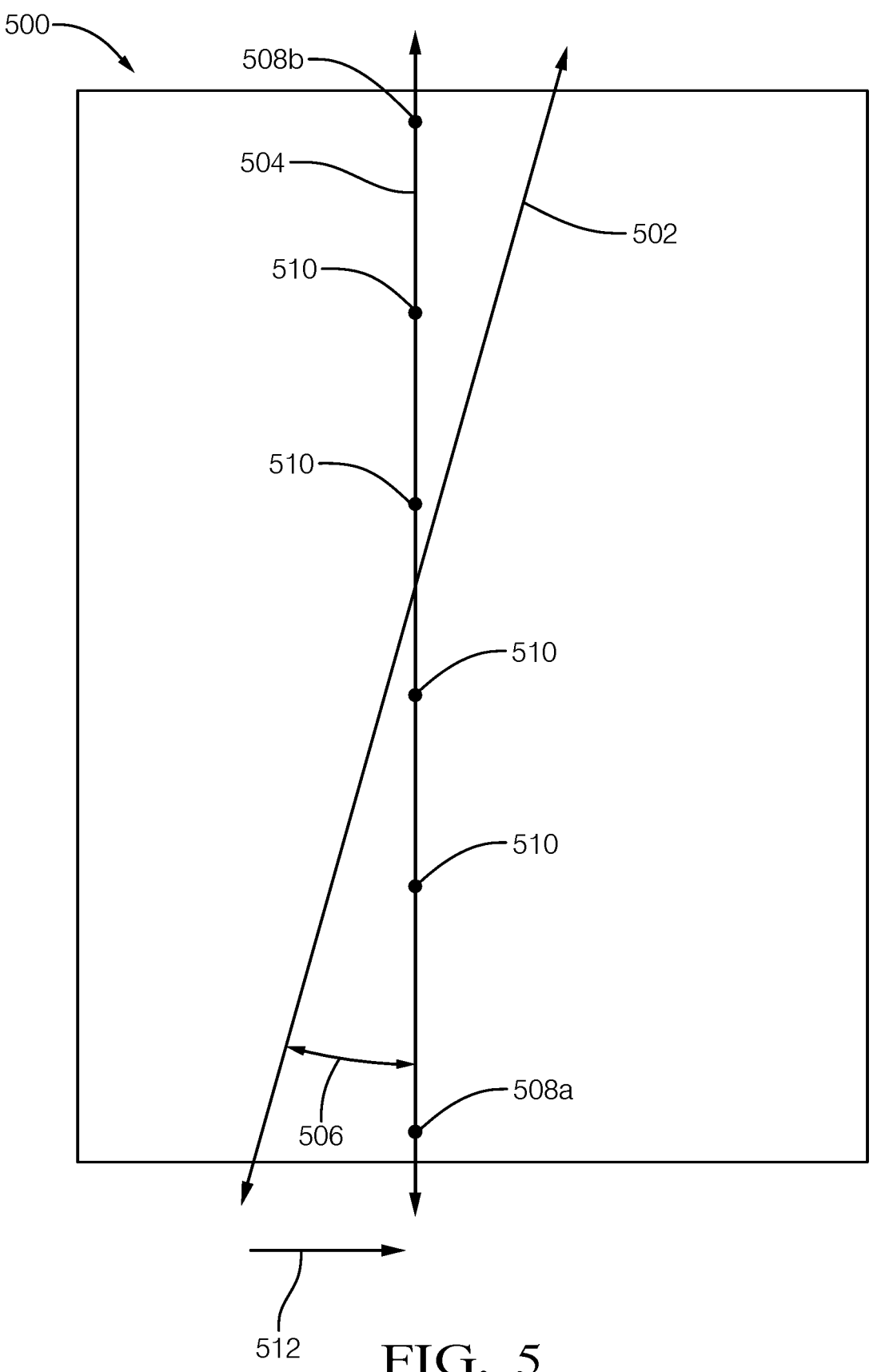
FIG. 5 is a diagram illustrating visually the correction of an orientation axis based on a detected planar surface according to some embodiments.

In some embodiments, vehicle processing unit 310 reviews surfaces provided by the plurality of LiDAR controllers 304 and detects planar surfaces to compare with orientation data received from the IMU. In some embodiments, a surface is identified as planar if a plurality of points located between a first point and a second point are located on the same plane. For example, FIG. 5 illustrates a surface 500 detected by a LiDAR controller 304. A plurality of points located on the surface 500 are selected and utilized to determine whether the points extend along a single axis or plane. In some embodiments, the determination of whether a surface is planar is based on a fewer number of points than are included with the surface. In some embodiments, the points are selected along the entire surface 500, while in other embodiments points are selected along an axis defined by the surface 500. For example, as shown in FIG. 5, an axis 504 is defined by first point 508*a* selected at or near a bottom of the surface 500 and a second point 508*b* selected at or near a top of the surface 500. The surface 500 is determined to be planar if a plurality of points (labeled "510") located between the first point 508*a* and the second point 508*b* are located on approximately the same plane. In some embodiments, a confidence level is assigned to the detected planar surface 500 based on how closely the selected points are aligned along the same plane. In some embodiments, the confidence level must be higher than a threshold value or the surface is discarded as not planar. In some embodiments, the confidence level is retained and utilized in subsequent steps to weight the correction or adjustment made to the orientation data.

Assuming the surface is determined to be planar, then one or more axes defining the planar surface are compared with one or more axes of the orientation data provided by the IMU 306. In some embodiments, if the difference or variance between the compared axes is greater than a threshold value, this indicates that the planar surface 500 is not closely enough aligned with an orientation axis of the IMU 306 to be utilized for correction. The assumption relied on here is that the orientation data provided by the IMU 306 may have some errors, but those errors will not be egregious. For example, if a stop sign is leaning at a 45 degree angle, the planar surface of the signpost will be sufficiently planar, but the difference between the vertical orientation axis provided by the IMU 306 and the axis defined by the signpost is so great that it is likely the signpost is not aligned with the vertical axis of the vehicle.

In some embodiments, if the variance between the compared axes is greater than a threshold value, a second check may be performed to determine whether the axis defined by the planar surface is aligned with a cardinal direction. In some embodiments, this check is only performed with respect to horizonal axes. If the variance or difference between the axis associated with the planar surface and the cardinal axis are greater than a threshold value, then it is determined that the planar surface cannot be utilized to correct the orientation data and the surface is discarded.

Assuming that the comparison between the one or more axes associated with the planar surface and either the orientation axis defined by the IMU 306 or the cardinal axes, then the one or more axes defined by the planar surface are assumed to be aligned with the one or more axes of the vehicle. Based on this assumption, the variance or difference between the one or more axes defined by the planar surface and the one or more axes provided by the IMU 306 are determined to be the result of errors in the IMU 306. For example, in the embodiment shown in FIG. 5, the planar surface 500 is defined by a vertical axis 504, which is compared to a vertical axis 502 defined by the IMU 306. The variance between the two axes is defined by angle 506, which represents the error attributable to the IMU 306.

Based on the detected variance between the respective axes, vehicle processing unit 310 generates orientation feedback provided to IMU correction unit 308. In some embodiments, the magnitude of the orientation feedback is based on the magnitude of the variance detected between the respective axes. In some embodiments, if the variance is greater than a threshold value (referred to herein as a "nudge threshold"), then the magnitude of the orientation feedback is assigned a predetermined value. In some embodiments, the magnitude of the orientation feedback if the variance is greater than the nudge threshold is equal to the nudge threshold. In other embodiments, the magnitude of the orientation feedback may be greater than or less than the nudge threshold. In some embodiments, if the variance is less than the nudge threshold, then the magnitude of the orientation feedback is equal to the magnitude of the variance. In some embodiments, the magnitude of the orientation feedback provided to the IMU correction unit 308 is further based on the confidence level associated with the determination. For example, this may include the confidence level associated with the planar surface detected by the LiDAR sensors 302, wherein a higher confidence level in the detected planar surface results in the orientation feedback being assigned a greater value than a lower confidence level. In some embodiments, the orientation feedback provided to the IMU correction unit 308 is added to previously calculated orientation feedbacks, such that IMU correction unit 308 accumulates orientation feedback values calculated by the vehicle processing unit 310. In some embodiments, the orientation feedback provided to the IMU correction unit 308 is latched to ensure the corrective value is retained by the IMU correction unit 308.

In this way, orientation data provided by IMU 306 is augmented with correction values stored by the IMU correction unit 308. Each time orientation data is calculated by the IMU 306, the orientation data is adjusted by the values stored in the IMU correction unit, 308 wherein the value stored in the IMU correction unit 308 is continually updated based on comparisons between the (corrected) IMU orientation data and the planar surfaces detected by the one or more LiDAR sensors 302 and LiDAR controller 304.

Figure 4:
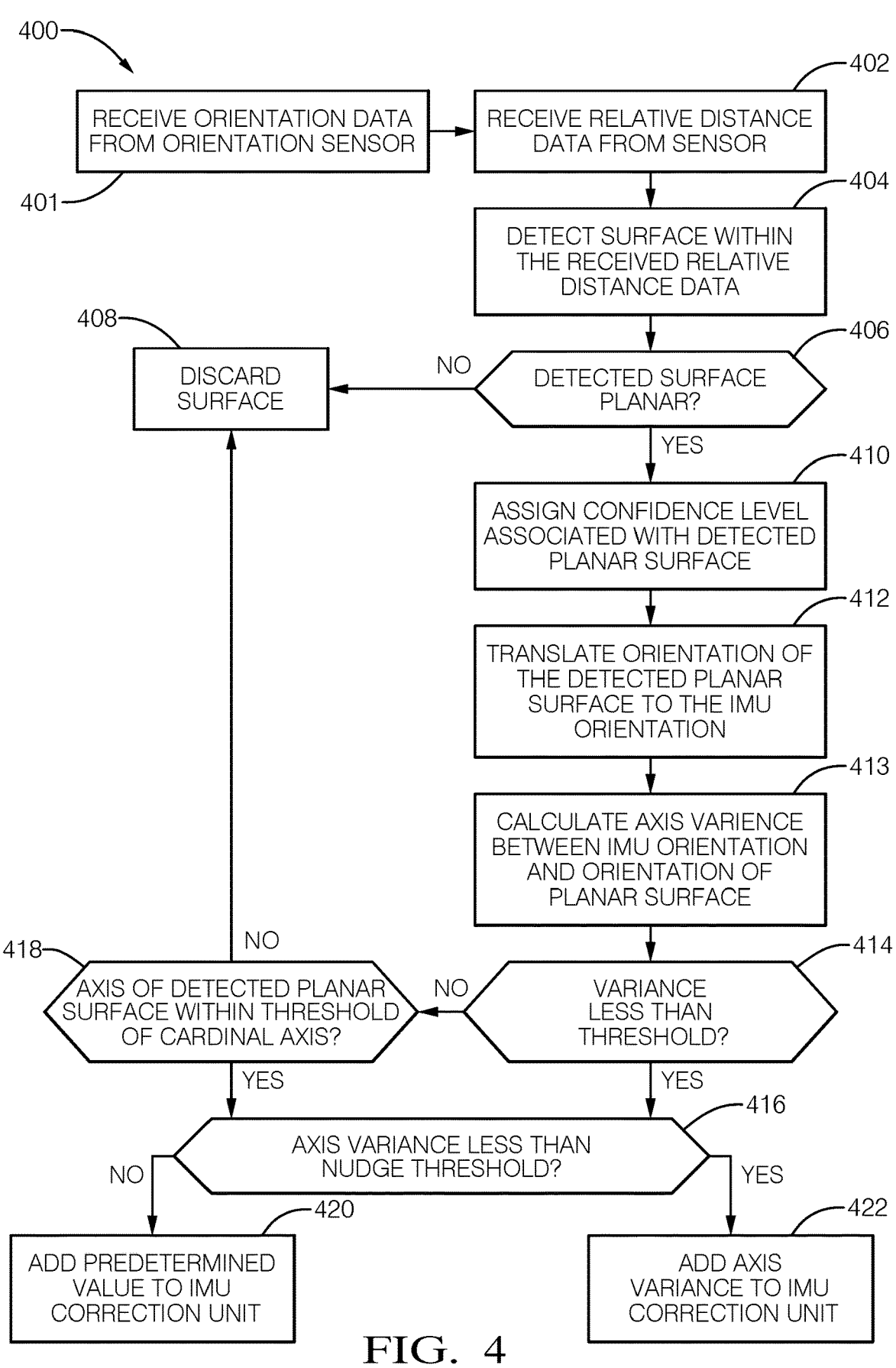
FIG. 4 is a flowchart that illustrates steps performed to correct orientation errors based on relative distances measured by a distance sensor according to some embodiments.

FIG. 4 is a flowchart illustrating steps performed to correct orientation data based on relative distances collected by one or more distance sensors. It should be understood that the sequence of the steps may be modified and that in some embodiments one or more of the steps may be omitted.

At step 401, orientation data is received from the orientation sensor (e.g., IMU sensor). At step 402, relative distance data is received from one or more distance sensors. As described above, a number of difference types of distance sensors may be utilized, including one or more of LiDAR-based sensors, radar-based sensors, vision-based sensors, etc. In some embodiments, the relative distance data collected by the distance sensors is provided in the form of a point cloud, wherein each point is defined by a distance from the sensor to the object.

At step 404, surfaces are detected within the received relative distance data. Processing of the relative distance data may be performed locally by the distance sensor or may be performed separate from the distance sensor—such as by vehicle processing unit. The step of detecting surfaces within the relative distance data may be utilized in other applications, such as part of the process of object detection. In some applications, the step of detecting surfaces is referred to as point clustering, wherein the plurality of points included in the point cloud are clustered together based on their distance to one another to form and detect surfaces. In some embodiments, additional analysis is performed on the detected surfaces to classify surfaces into objects (e.g., car, building, pedestrian, etc.).

At step 406, surfaces detected at step 404 are analyzed to determine if they are planar. In some embodiments, the determination of whether an object is planar involves selecting a plurality of points along the detected surface and checking to determine whether the plurality of points are located along a particular plane or axis. In the example shown in FIG. 5, having detected the surface 500, a plurality of points are selected with respect to the surface 500 and utilized to determine if the surface is planar. In some embodiments the points selected are located along an axis as shown in FIG. 5, but in other embodiments may be selected at random along the entire surface. In addition, the number of points tested to determine whether the surface is planar may be less than the total number of points identified with respect to the surface. If the surface is identified as not planar at step 406, then it is discarded at step 408. If the surface is identified as planar at step 406, then the process continues at step 410.

In some embodiments, at step 410 a confidence level is assigned to the surface based on analysis of whether the surface is planar. In some embodiments, surfaces determined to be more planar are assigned a higher confidence level and surfaces determined to be less planar are assigned a lower confidence level (assuming the surface is planar enough to not be discarded entirely). In addition, the confidence level may also be based on the number of points analyzed with respect to the surface, wherein as the number of points analyzed increases the confidence associated with the surface being planar also increases (assuming the points are determined to be located along an axis or plane). As described in more detail below, in some embodiments the confidence level assigned to the surface is utilized to determine the adjustment or correction applied to the orientation sensor, wherein high confidence in the surface being planar results in larger adjustments/corrections.

In some embodiments, at step 412 the orientation of the detected planar surface is translated into the orientation of the vehicle. For example, if the distance sensor utilized to capture the planar surface is oriented in a direction known to be offset from an orientation or particular axis of the vehicle (i.e., downward) then the surface is translated to account for this offset. Typically, the orientation of the distance sensor relative to the vehicle is known, such that the translation remains the same with respect to surfaces detected by particular sensors.

At step 413, a variance or difference between the orientation axis of the vehicle and the orientation of the detected planar surface is calculated. The variance represents the error between the orientation axis provided by the orientation sensor and the orientation of the planar surface. However, this does not necessarily imply that the variance represents the error in the orientation sensor, only the difference between the axis of the orientation axis of the vehicle (provided by the orientation sensor) and the orientation of the planar surface. In some embodiments, at step 414, the variance is utilized to determine whether the planar surface is a good fit for estimating error in the orientation sensor, and then at steps 416-422 a determination is made regarding how to correct the orientation sensor based on the orientation of the detected planar surface.

At step 414, an axis associated with the detected surface is compared to an orientation axis provided by the orientation sensor. At step 414, a determination is made whether the axes are aligned closely enough that the axis associated with the detected surface is determined to be a good candidate for correcting the orientation sensor. Planar surfaces not aligned with an axis of the vehicle (for example, a building aligned at an angle relative to the street on which the vehicle is located) are not useful for correcting the orientation sensor and should be discarded. In some embodiments, if the variance or difference between the axes is less than a threshold, this is an indication that the axis associated with the planar surface is likely aligned with an orientation axis of the vehicle and can be utilized to correct the orientation sensor. In some embodiments, the threshold is a fixed value, while in other embodiments the threshold may vary. For example, the threshold may be increased to accept more planar surfaces as potentially useful as the duration between corrections increases. That is, in an environment in which a plurality of planar surfaces aligned with the orientation of the vehicle are detected, it may be beneficial to discard those planar surfaces determined to be offset from the orientation of the vehicle even by a small amount. In an environment (e.g., driving in the country) in which very few planar surfaces are identified as useful for correcting orientation errors, it may be beneficial to increase the threshold to utilize planar surfaces that would otherwise have been discarded.

In some embodiments, if the variance between the axes is greater than a threshold at step 414 then the planar surface is discarded at step 408. In other embodiments, if the variance between axes is greater than a threshold, at step 418 one or more axes associated with the planar surface are compared to cardinal coordinates to determine if the planar surface is aligned with the cardinal coordinate system. If the planar surface is aligned with a cardinal direction (e.g., East, West, North, South) and the heading of the vehicle is known, then the planar surface may still be utilized to correct the orientation sensor. If the variance between the axis of the planar surface and the cardinal axis is greater than a threshold—indicating that the planar surface is not aligned with a cardinal direction—then the planar surface is discarded at step 408. If the variance between the axis of the planar surface and the cardinal axis is less than a threshold-indicating that the planar surface is aligned with a cardinal direction—then the planar surface is utilized at step 416 to correct the orientation sensor.

In some embodiments, having determined either at step 414 or step 418 that the planar surface is a good candidate for correcting the orientation sensor, an orientation feedback value is generated to be provided in feedback to the orientation sensor. That is, a determination in the affirmative at either step 414 or step 418 indicates that a detected surface is planar and that one or more axes associated with the detected surface area aligned with the one or more axes of the vehicle. The result of this assumption is that variances or differences detected between the one or more axes defined by the planar surface and the orientation data provided by the orientation sensor are attributed to errors in the orientation sensor. In some embodiments, based on these detected errors, orientation feedback may be provided to correct the orientation data provided by the orientation sensor. As described above with respect to FIG. 1 and FIG. 3, in some embodiments this may include providing the orientation feedback directly to the orientation sensor itself to re-initialize or align the orientation sensor with the corrected orientation. In other embodiments, as shown in FIG. 3 for example, the orientation feedback is latched into a correction unit such as the IMU correction unit 308, which accumulates corrections provided in response to detected variances.

In some embodiments, the orientation feedback provided is referred to as a "nudge" because it acts to slowly modify (i.e., nudge) the correction applied to the orientation sensor to prevent large changes in the correction applied to the orientation data. The magnitude of the orientation feedback may be determined in a variety of ways. For example, in some embodiments a fixed value is assigned regardless of the magnitude of the detected variance between the respective axes. The fixed value is typically small and ensures that each adjustment is relatively small in nature. In other embodiments a variable nudge value is assigned based on the magnitude of the axis variance. Steps 414 and 418 ensure that the magnitude of the variance is less than the threshold values utilized in those steps, but this may still lead to large adjustments to the orientation data. In some embodiments, step 416 is utilized to ensure that the magnitude of the orientation feedback does not exceed a threshold value. In some embodiments, the magnitude of the orientation feedback is based on the magnitude of the variance as well as the confidence level associated with the detected planar surface (determined at step 410). That is, for a surface determined to be very planar and therefore being assigned a high confidence level, the magnitude of the correction applied may be greater. Conversely, a surface determined to be only somewhat planar and therefore assigned a low confidence level will result in a lower magnitude correction being applied.

In other embodiments, as shown in FIG. 4, a trade-off between a fixed nudge value and a dynamic nudge value is provided. In the embodiment shown in FIG. 4, at step 416 the variance between the one or more axes detected with respect to the planar surface and the one or more orientation axes defined by the orientation sensor is compared to a nudge threshold. If the variance is less than the nudge threshold, indicating a relatively small difference between the planar surface axis and the orientation axis, then the magnitude of the variance is utilized as the orientation feedback provided to the IMU correction unit at step 422. If the variance is greater than the nudge threshold, indicating a relatively large difference between the planar surface axis and the orientation axis, then a fixed value is utilized as the orientation feedback provided to the IMU correction unit at step 420. In some embodiments, the fixed value has a magnitude equal to the magnitude of the nudge threshold. In this way, step 416 ensures that the fixed value utilized at step 420 represents the largest orientation correction provided in feedback to the IMU correction unit 308.

The process is repeated with each surface detected based on distance data provided by the one or more distance sensors. Orientation data measured by the one or more orientation sensors is corrected by the accumulation of orientation feedback values over time. In this way, correction is provided to prevent errors from accumulating in the orientation sensor.

Discussion of Possible Embodiments

The following are non-exclusive descriptions of possible embodiments of the present invention.

According to some aspects, an orientation system installed on a vehicle includes an orientation sensor, a distance sensor and a vehicle processing unit. The orientation system is configured to generate orientation data, and the distance sensor is configured to generate relative distance data measuring relative distances to objects external to the vehicle. The vehicle processing unit is configured to receive the orientation data from the orientation sensor and the relative distance data from the distance sensor, wherein the vehicle processing unit detects orientation errors based on the relative distance data.

The system of the preceding paragraph can optionally include, additionally and/or alternatively any, one or more of the following features, configurations and/or additional components.

For example, in some embodiments the vehicle processing unit may provide orientation feedback to the orientation sensor to correct the detected orientation errors.

In some embodiments, the vehicle processing unit may be configured to detect planar surfaces based on the received relative distance data and to define one or more axes associated with the detected planar surface.

In some embodiments, the vehicle processing unit may further compare an orientation axis derived from the orientation data to the one or more axes associated with the detected planar surface.

In some embodiments, the vehicle processing unit may generate orientation feedback in response to the variance between the compared axes being less than a threshold value.

In some embodiments, the orientation feedback may be assigned a magnitude equal to the variance in response to the variance being less than a nudge threshold.

In some embodiments, the orientation feedback may be assigned a predetermined magnitude in response to the variance being greater than the nudge threshold.

In some embodiments, the predetermined magnitude may be equal to the nudge threshold.

In some embodiments, the orientation feedback may be provided in feedback to the orientation sensor.

In some embodiments, the orientation feedback may be provided in feedback to an orientation correction unit that accumulates corrections over time.

In some embodiments, the distance sensor may include one or more of a radar-based sensor, a LiDAR-based sensor, a laser-based sensor, and a vision-based sensor.

According to another aspect, a method of correcting orientation errors accumulated in an orientation sensor is provided, the method includes receiving orientation data defining orientation of a vehicle along one or more orientation axes and receiving relative distance data from a distance sensor, wherein the relative distance data is comprised of relative distances measured to external objects. The method further includes detecting planar surfaces in the received relative distance data and one or more surface axes associated with the detected planar surfaces and calculating a variance between the orientation axes and the planar axes. One or more of the orientation axes is corrected in response to the calculated variance being less than a threshold value.

The system of the preceding paragraph can optionally include, additionally and/or alternatively any, one or more of the following features, configurations and/or additional steps.

In some embodiments, the step of detecting planar surfaces may further include detecting variances in the planar surface and discarding detected planar surfaces having variances greater than a second threshold.

In some embodiments, the method may further include assigning a confidence value to a detected planar surface.

In some embodiments, correcting one or more orientation axes may further include generating an orientation feedback value having a magnitude based on the assigned confidence value.

In some embodiments, correcting one or more orientation axes may include generating orientation feedback having a magnitude based, at least in part, on the calculated variance.

In some embodiments, the orientation feedback may be assigned a value equal to the variance if the calculated variance is less than a nudge threshold.

In some embodiments, the orientation feedback may be assigned a fixed value if the calculated variance is greater than the nudge threshold.

In some embodiments, the fixed value may be equal to the nudge threshold.

In some embodiments, the orientation feedback is added to a running orientation correction value, wherein the running orientation correction value represents an accumulation of received orientation feedback.

The invention claimed is:

1. An orientation system installed on a vehicle, the orientation system comprising:
   an orientation sensor configured to generate orientation data, wherein the orientation data defines orientation of the vehicle along an orientation axis;
   a distance sensor configured to generate relative distance data measuring relative distances to objects external to the vehicle; and
   a vehicle processing unit configured to receive the orientation data from the orientation sensor and the relative distance data from the distance sensor, wherein the vehicle processing unit is configured to:
      detect planar surfaces based on the received relative distance data and to define one or more axes associated with the detected planar surface;
      compare the orientation axis to the one or more axes associated with the detected planar surface to detect a variance between the one or more axes defined by the detected planar surface and the orientation axis;
      detect orientation errors based on the variance between the one or more axes defined by the detected planar surface and the orientation axis;
      generate orientation feedback in response to the detected orientation errors; and
      compare a nudge threshold to the variance between the one or more axes defined by the detected planar surface and the orientation axis,
      wherein the orientation feedback is assigned a nudge value magnitude in response to the variance between the one or more axes defined by the detected planar surface and the orientation axis being greater than the nudge threshold.

2. The orientation system of claim 1, wherein the vehicle processing unit provides the orientation feedback to the orientation sensor to correct the detected orientation errors.

3. The orientation system of claim 1, wherein the vehicle processing unit generates orientation feedback in response to the variance between the compared axes being less than a threshold value.

4. The orientation system of claim 3, wherein the orientation feedback is assigned a variable nudge value magnitude equal to the variance in response to the variance being less than the nudge threshold.

5. The orientation system of claim 1, wherein the nudge value and the nudge threshold are predetermined values.

6. The orientation system of claim 5, wherein the magnitude of the nudge value is equal to the nudge threshold.

7. The orientation system of claim 1, wherein the orientation feedback is provided in feedback to an orientation correction unit that accumulates corrections over time.

8. The orientation system of claim 1, wherein the distance sensor includes one or more of a radar-based sensor, a LiDAR-based sensor, a laser-based sensor, and a vision-based sensor.

9. A method of correcting orientation errors accumulated in an orientation sensor, the method comprising:
   receiving orientation data from an orientation sensor, the orientation data defining orientation of a vehicle along one or more orientation axes;
   receiving relative distance data from a distance sensor, wherein the relative distance data is comprised of relative distances measured to external objects;
   detecting planar surfaces in the received relative distance data and one or more surface axes associated with the detected planar surfaces;
   calculating a variance between the orientation axes and the planar axes;
   comparing the variance between the orientation axes and the planar axes to a nudge threshold;
   generating orientation feedback having a nudge value magnitude in response to the variance between the orientation axes and the planar axes being greater than the nudge threshold; and
   utilizing the orientation feedback to correct orientation errors accumulated in the orientation sensor.

10. The method of claim 9, wherein detecting planar surfaces includes detecting variances in the planar surface and discarding detected planar surfaces having variances greater than a second threshold.

11. The method of claim 10, further including assigning a confidence value to a detected planar surface.

12. The method of claim 11, wherein generating the orientation feedback includes generating orientation feedback based, at least in part, based on the assigned confidence value.

13. The method of claim 9, wherein the orientation feedback is assigned a value equal to the variance if the calculated variance is less than the nudge threshold.

14. The method of claim 13, wherein the nudge threshold and the nudge value are predetermined values.

15. The method of claim 14, wherein the nudge value is equal to the nudge threshold.

16. The method of claim 9, wherein the orientation feedback is added to a running orientation correction value, wherein the running orientation correction value represents an accumulation of received orientation feedback.

17. The method of claim 16, wherein the orientation correction value is applied to orientation data provided by the orientation sensor, wherein the orientation correction value corrects the orientation data.

18. The method of claim 9, wherein utilizing the orientation feedback to correct orientation errors accumulated in the orientation sensor includes providing the orientation feedback directly to the orientation sensor.

* * * * *